(12) United States Patent
Brown

(10) Patent No.: US 9,057,926 B1
(45) Date of Patent: Jun. 16, 2015

(54) MULTI-WAVELENGTH EMITTER ARRAY

(75) Inventor: Robert G. W. Brown, Tustin, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 503 days.

(21) Appl. No.: 13/360,546

(22) Filed: Jan. 27, 2012

(51) Int. Cl.
| | |
|---|---|
| *G02F 1/035* | (2006.01) |
| *G02F 1/31* | (2006.01) |
| *G02F 1/313* | (2006.01) |
| *G02F 1/01* | (2006.01) |

(52) U.S. Cl.
CPC ............. *G02F 1/31* (2013.01); *G02F 1/3137* (2013.01); *G02F 2001/0142* (2013.01)

(58) Field of Classification Search
CPC .......... G02F 1/3137; G02F 2001/0142; G02B 2006/12145
USPC ........................................ 385/2, 3, 15–19, 28
See application file for complete search history.

(56) References Cited

U.S. PATENT DOCUMENTS

| | | | |
|---|---|---|---|
| 2006/0145970 A1* | 7/2006 | Krijn et al. ...................... 345/81 |
| 2010/0284180 A1 | 11/2010 | Popovich et al. | |
| 2011/0063604 A1 | 3/2011 | Hamre et al. | |
| 2013/0082980 A1* | 4/2013 | Gruhlke et al. ............... 345/175 |

FOREIGN PATENT DOCUMENTS

JP         05241514 A   *   9/1993

* cited by examiner

*Primary Examiner* — Ryan Lepisto
*Assistant Examiner* — Erin Chiem
(74) *Attorney, Agent, or Firm* — Angel N. Gerdzhikov; Donna P. Suchy; Daniel M. Barbieri

(57) ABSTRACT

An array of pixel assemblies emitting multiple wavelengths in a direction and a method therefor, the array comprising: a plurality of pixel assemblies, each respective pixel assembly having a respective pixel area, the respective pixel assembly formed by: one or more waveguides made from electro-optically active material; a plurality of different wavelength emitters, the different wavelength emitters disposed at one or more of the ends of the respective one or more waveguides to propagate their respective wavelengths therealong and capable of being switched; and a one switch disposed to cause when activated, a shifting of the wavelengths propagating in the one or more waveguides of the pixel assembly by substantially 90 degrees to be emitted through the respective pixel area; and a backplane with an electronic circuit for switching the plurality of switches and the emitters.

11 Claims, 6 Drawing Sheets

MULTI-WAVELENGTH EMITTER ARRAY

BACKGROUND

Improved multi-wavelength arrays are desired and improved fabrication methods are desired.

SUMMARY

In embodiments, an array of pixel assemblies is provided for emitting multiple wavelengths in a direction, comprising: a plurality of pixel assemblies, each respective pixel assembly having a respective pixel area, the respective pixel assembly formed by: one or more waveguides made from electro-optically active material; a plurality of different wavelength emitters, the different wavelength emitters disposed at one or more of the ends of the respective one or more waveguides to propagate their respective wavelengths therealong and capable of being switched; and at least one switch disposed in relation to the one or more waveguides to cause when activated, a shifting of the wavelengths propagating in the one or more waveguides of the pixel assembly by substantially 90 degrees to be emitted through the respective pixel area; and a backplane with an electronic circuit for switching the plurality of switches and the emitters.

In embodiments, multiple of the different wavelength emitters are discrete emitters bonded to one of the ends of a respective one of the waveguides. In embodiments, the respective wavelength emitters are discrete emitters and the respective wavelengths of the different wavelength emitters are projected into one or both of the ends of the respective waveguide.

In embodiments, the respective waveguides have emitters disposed at only one end thereof to propagate wavelengths in only one direction therethrough. In embodiments, the waveguides have emitters disposed at each end thereof to propagate wavelengths in opposite directions through the respective waveguide.

In embodiments, the waveguides of the plurality of the pixel assemblies are disposed in parallel in a single plane.

In embodiments, at least one of the emitters in the respective pixel assembly emits a visible wavelength.

In embodiments, at least one of the emitters in the respective pixel assembly emits a wavelength that is not visible.

In embodiments, each of multiple of the pixel assemblies include at least one emitter that emits visible wavelengths and at least one emitter that emits a wavelength that is not visible.

In embodiments, the array of pixel assemblies comprises: a first plurality of the waveguides made from electro-optically active material disposed in parallel in a first plane; a second plurality of the waveguides made from electro-optically active material disposed in a second plane that is parallel to the first plane, with the second plurality of waveguides substantially perpendicular to the first plurality of waveguides; wherein each of the respective waveguides has at least two of the different wavelength emitters disposed to propagate their respective wavelengths along the respective waveguide, the wavelength emitters capable of being switched; wherein each of the pixel areas is formed by one or more different respective switches disposed to cause when activated, a shifting of the wavelengths propagating in a first volume of one of the waveguides in the first plurality of waveguides and a second volume of one of the waveguides in the second plurality of waveguides, with the second volume disposed below the first volume, by substantially 90 degrees, to be emitted through the respective pixel area.

In embodiments, an array of pixel areas are provided for emitting multiple wavelengths in a direction, comprising: a plurality of waveguides made from electro-optically active material disposed in parallel in a plane; a plurality of different wavelength emitters, with each of the respective waveguides having at least two of the different wavelength emitters disposed to propagate their respective wavelengths along the respective waveguide, the wavelength emitters capable of being switched; a plurality of pixel areas, with each of the respective pixel areas formed by a different respective switch disposed to cause when activated, a shifting of the wavelengths propagating in a respective volume of one of the waveguides below the respective pixel area, by substantially 90 degrees, to be emitted through the respective pixel area; and a backplane with an electronic circuit for switching the respective switches and the emitters.

In embodiments, a method for emitting multiple wavelengths in a direction to form a pixel array is provided, comprising for each pixel in the array: generating a plurality of pixel wavelengths through a pixel area, comprising the steps: propagating a plurality of different wavelengths along a length of one or more respective waveguides of electro-optically active material; and shifting in response to a switching signal the plurality of different wavelengths propagating in the one or more respective waveguides by substantially 90 degrees to emit the plurality of different wavelengths through the respective pixel area.

In embodiments, the propagating step comprises propagating wavelengths in only one direction through one or more of the respective waveguides.

In embodiments, the propagating step comprises propagating wavelengths in opposite directions through one or more of the respective waveguides.

In embodiments, the plurality of different wavelengths are propagated along a length of a single waveguide for a respective pixel; and the respective waveguide for each pixel is arranged in parallel with the single waveguides of other of the pixels.

In embodiments, each of the pixels is formed by a first and a second waveguides, and the propagating step comprises propagating a first set of the different wavelengths along a length of the first waveguide, and propagating a second set of the different wavelengths along a length of the second waveguide; wherein the respective first waveguides are arranged in parallel in a first plane, and wherein the respective second waveguides are arranged in parallel in a second plane that is parallel to the first plane.

BRIEF DESCRIPTION OF THE DRAWINGS

The above and related objects, features and advantages of the present disclosure, will be more fully understood by reference to the following detailed description of the illustrative implementations of the subject matter described in this specification, when taken in conjunction with the following illustrative figures, wherein.

DETAILED DESCRIPTION OF EMBODIMENTS

Figure 1:
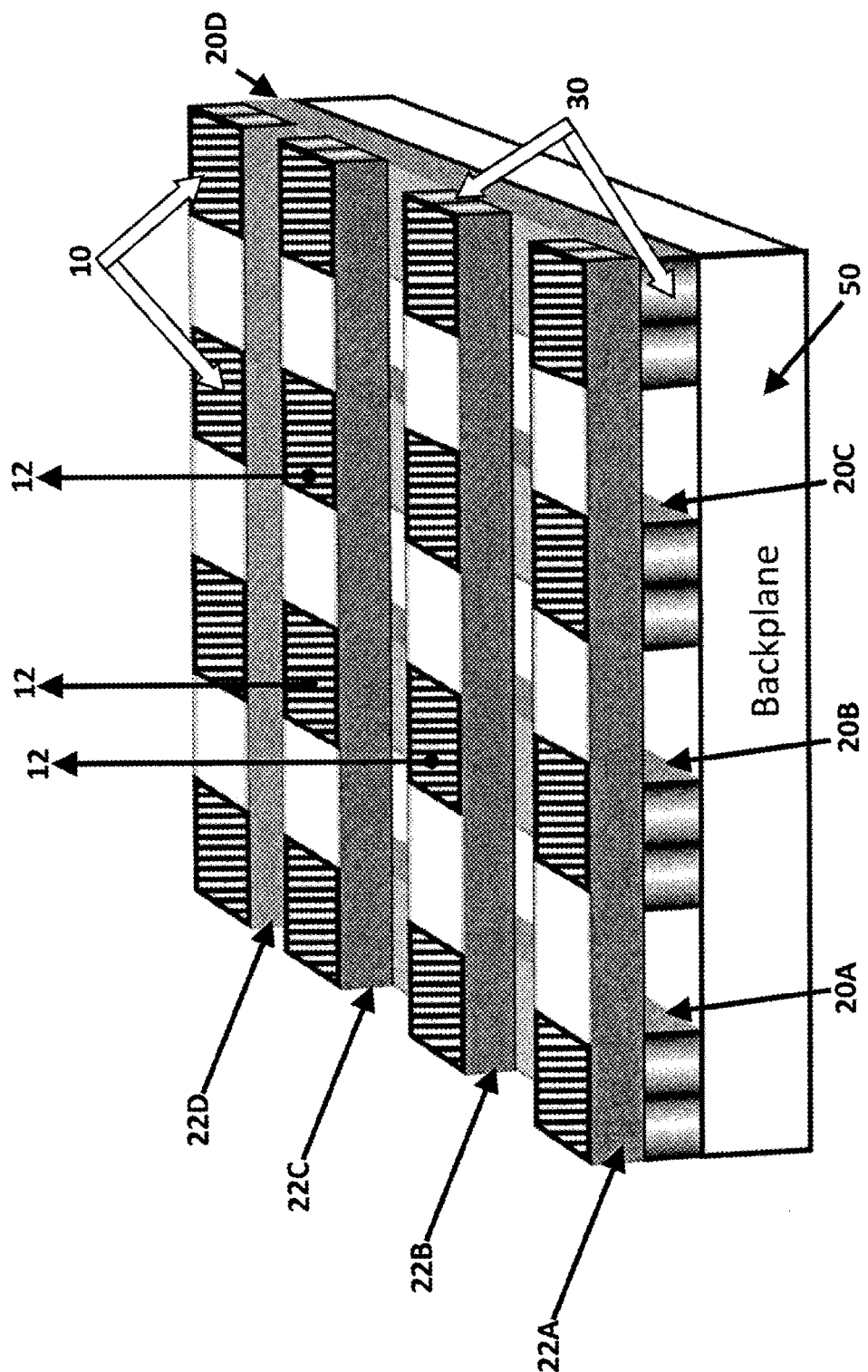
FIG. 1 is a schematic perspective diagram of an embodiment using waveguides in two parallel planes.
Figure 2:
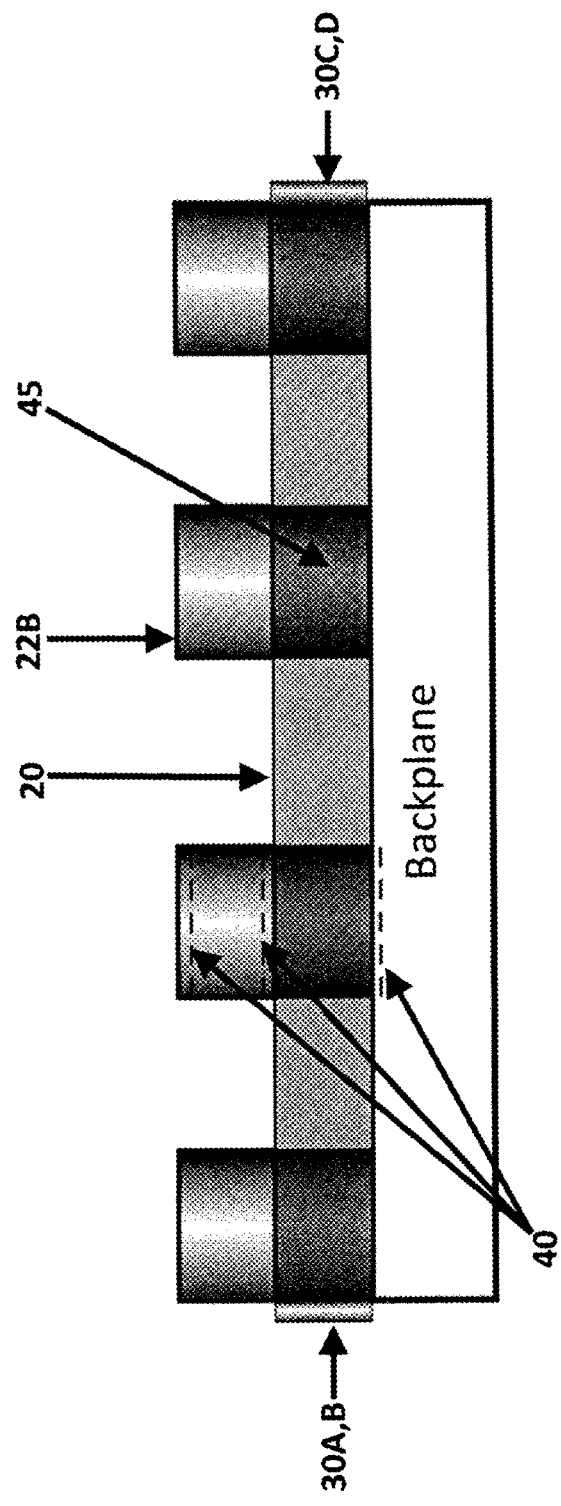
FIG. 2 is a cross-section of the embodiment of FIG. 1.

Referring to FIGS. 1 and 2, an embodiment of the invention is illustrated. This embodiment is directed to creation of an array of a plurality of pixel areas 10 emitting multiple wavelengths 12 in a direction.

In embodiments, each of the respective pixel areas 10 in the array is disposed above one or more waveguides made from electro-optically active material. In the embodiment of FIGS. 1 and 2, a first plurality of waveguides 20A-20D and a second plurality of waveguides 22A-22D are shown. The first plurality of waveguides 20A-20D are made from electro-optically active material and are disposed in parallel in a first plane. The second plurality of waveguides 22A-22D are made from electro-optically active material and are disposed in a second plane that is parallel to the first plane, with the second plurality of waveguides substantially perpendicular to the first plurality of waveguides.

In embodiments, a plurality of different wavelength emitters 30 are disposed at one or more of the ends of the respective one or more waveguides to propagate their respective wavelengths therealong. These wavelength emitters may be switched by applying a switching signal to the respective emitter. In embodiments, the respective emitters may be bonded to the ends of the respective waveguides, or may be arranged to project a respective wavelength into the waveguide, or any other convenient method may be used to direct a wavelength from the emitter into the waveguide. In the embodiment of FIGS. 1 and 2, there are two emitters, 30A, 30B and 30C, 30D, disposed at each end of the respective waveguide to propagate their respective wavelengths therealong. Accordingly, for this embodiment, two different wavelength are propagating in one direction in the waveguide, and two other wavelengths are propagating in the same waveguide in the opposite direction. Note that in embodiments, the number of emitters disposed at an end of the waveguide may be 1, or 2, or 3 or 4, or 8, or any other convenient number of emitters. In embodiments, two or more emitters may be disposed at only one end of the waveguide. In embodiments, one or more emitters may be disposed at opposite ends of the waveguide. In embodiments, the number of emitters disposed at the respective opposite ends of the waveguide may be different, e.g., one emitter disposed at one end and two emitters disposed at the opposite end of the waveguide.

In embodiments, each of the emitters may be switched on or off. Such on-off switching may be used to obtain a perception of multiple different colors, with each color dependent on which combination of emitters is switched on. For example, 4 emitters may be switched on sequentially in a given pixel to inject different colors sequentially during the pixel on-time, or may be switched on in parallel within the pixel during the pixel on time, so that their intensity and on-times add to give the desired perception of colors and desired brightnesses, pixel by pixel. Such phasing of the on-off times of the emitters of a given pixel and the pixel-switching events, may be controlled by a backplane electronic processor. In embodiments, the signal for the switching may be provided via a connection of the emitters to a backplane signal processor.

Note that the wavelengths emitted are not restricted to any one band. In embodiments, the wavelengths may be in the ultraviolet wavelength band, and/or in the infrared wavelength band, and/or in the color wavelength band, for example. In embodiments, there may be wavelengths from a plurality of wavelength bands, e.g., ultraviolet and blue.

In embodiments, for each respective pixel area at least one switch 40, such as for example, an electro-optic or photonic switch mechanism, disposed in relation to the one or more waveguides to cause, when activated, a shifting of the wavelengths propagating in the one or more waveguides by substantially 90 degrees, to be emitted through the respective pixel area. FIG. 2 illustrates switching volumes 45 for the waveguide 20. The type of switch may take a variety of different forms currently available or to be developed in the future, and are not limiting on the invention. Examples of such switches are described below. In the embodiment of FIGS. 1 and 2, each of the pixel areas receives wavelength emissions by a shifting by substantially 90 degrees the wavelengths propagating in either direction in a first volume of one waveguides in the first plurality of waveguides 20A-20D and a shifting by substantially 90 degrees the wavelengths propagating in either direction in a second volume of one of the waveguides in the second plurality of waveguides 22A-22D, with the second volume disposed below the first volume.

In embodiments, a backplane 50 is provided with an electronic circuit for switching the plurality of switches and the emitters. In embodiments, the backplane may be a semiconductor backplane, e.g., materials from Groups III, IV, V, and VI of the Periodic Table, and may be comprised of a silicon CMOS chip layer.

In embodiments, a transparent ITO (indium tin oxide—or other electrical-contact coating used in the LCD industry) may be used for the electrodes of the switches 40. However, the type of material used for the electrodes is not limiting on the invention. An alternative electrode material may be PEDOT:PSS. The electrodes 40 are placed above and below the volumes in the waveguides below the pixel area to define an electrically-activated pixel switch-area. In embodiments, these electrodes 40 may be connected down to a CMOS-backplane chip layer of the backplane to effect an electrical switching of a particular wavelength emitter, e.g., an LED-light color at a correct time and for a correct duration to construct a correct display frame.

In embodiments, the waveguides 20A-20D and 22A-22D may be of rectangular or square cross-section and may contain electro-optic materials that the CMOS-back-plane circuitry can act upon to switch the direction of the propagating light 'out-of-plane' by 90 degrees. As noted, the many possible ways in which this switching may be achieved will be described below.

Accordingly, in embodiments represented by FIGS. 1 and 2, at the periphery of the area that will constitute the active display emitter-pixel array, and on all four sides if needed, LED or laser-diode die-elements may be disposed to efficiently launch their output wavelengths, into the optical waveguide structures. In the dual-layer waveguide embodiment of FIGS. 1 and 2, the waveguide structures 'criss-cross' the intended display-area similar to a chess-board, providing rows and columns of pixels, underneath each of which is a CMOS-based electrical switch that will operate when require to direct light out of the waveguide perpendicular to the 2D-plane of the pixel display areas. Accordingly, in embodiments, a pixelated, row/column-addressed display is realized.

In embodiments, a 2D pixelated-array of light of different wavelengths is created. In embodiments, such a pixelated-array may be of different colors or be capable of providing all or a group of colors for the purposes of creating a display. In embodiments, typical pixel sizes may be 10-microns to 100-microns in square cross-section, but may be larger or smaller, based on design choice. In embodiments, rectangular cross-section waveguides may be used with approximately these sizes, as their dimensions define at least in part the pixel cross-sectional area.

Figure 3:
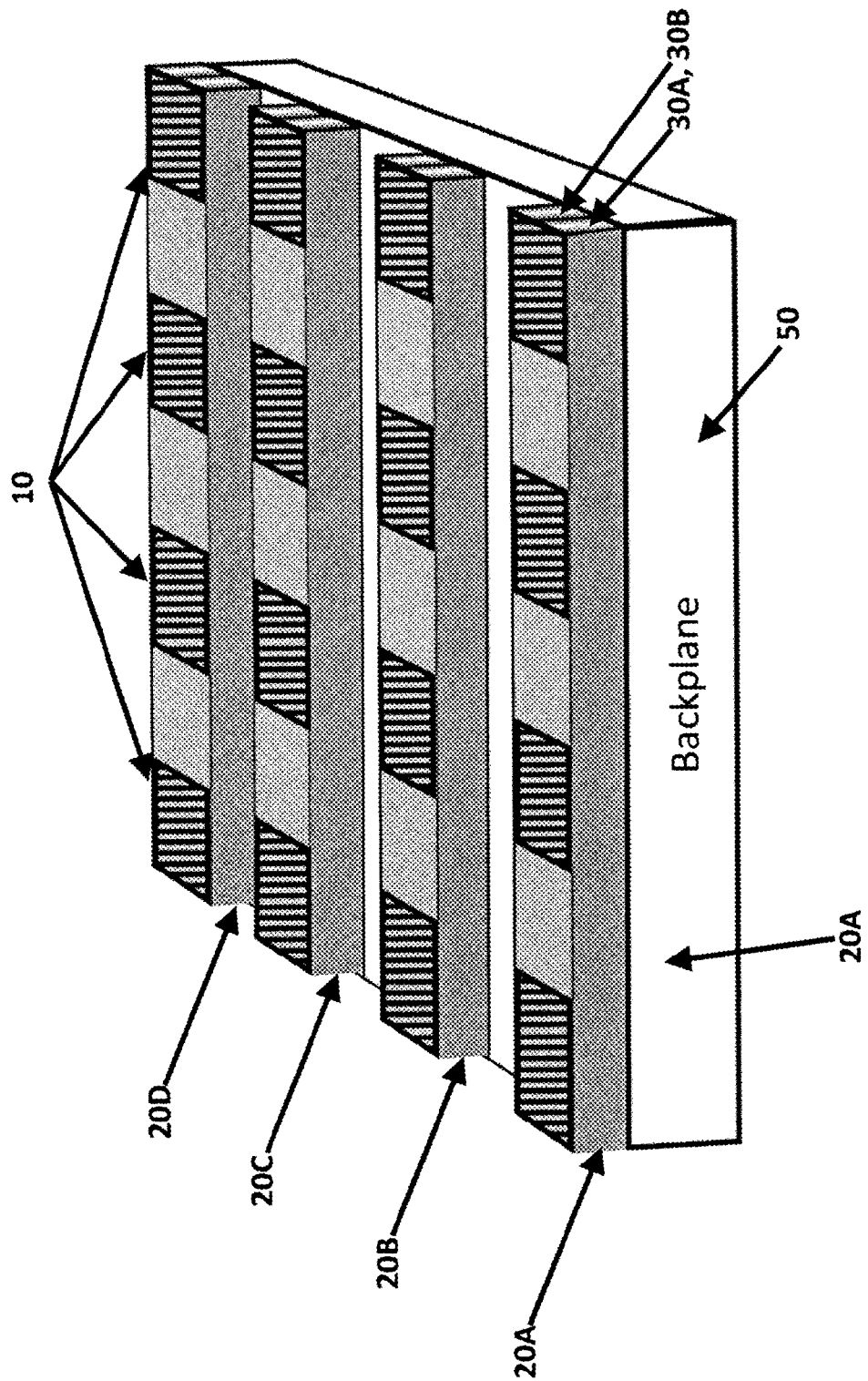
FIG. 3 is a schematic perspective diagram of an embodiment using waveguides in one plane.
Figure 4:
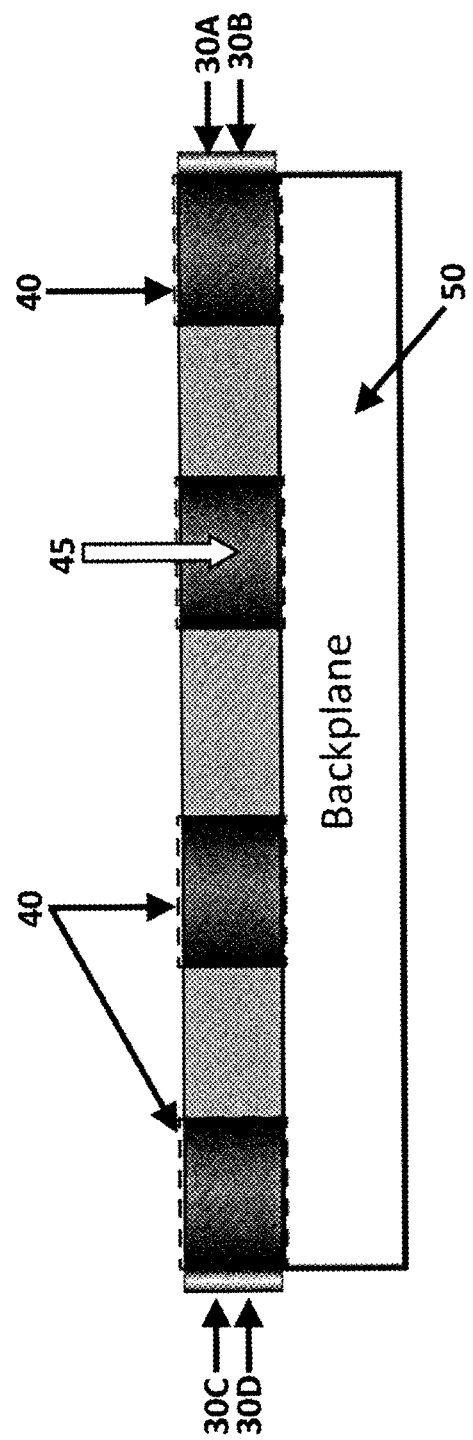
FIG. 4 is a cross-section of the embodiment of FIG. 3.

FIGS. 3 and 4 illustrate another of the embodiments comprising waveguides in a single plane. Referring to these figures, a plurality of waveguides 20A-20D made from electro-optically active material are shown disposed in parallel in a plane.

In the embodiments, a plurality of different wavelength emitters 30A, 30B, 30C, and 30D are shown, with each of the respective waveguides 20 having at least two of the different wavelength emitters disposed at each end to propagate their respective wavelengths along the respective waveguide. In embodiments, the number of emitters disposed at an end of the waveguide 20 may be 1, or 2, or 3 or 4, or 8, or any other convenient number of emitters. In embodiments, two or more emitters may be disposed at only one end of the waveguide. In embodiments, one or more emitters may be disposed at opposite ends of the waveguide. In embodiments, the number of emitters disposed at the respective opposite ends of the waveguide may be different, e.g., one emitter disposed at one end and two emitters disposed at the opposite end of the waveguide.

In embodiments, a plurality of pixel areas 10 are provided, with each of the respective pixel areas 10 formed by a different respective switch 40 disposed to cause when activated, a shifting of the wavelengths propagating in a respective volume 45 of one of the waveguides below the respective pixel area 10, by substantially 90 degrees, to be emitted through the respective pixel area 10.

In embodiments, a backplane 50 is provided with an electronic circuit for switching the respective switches and the emitters.

One or more of the following advantages may be realized. In some embodiments, an advantage may be realized of being able to use off-the-shelf laser-diode or LED dies in linear-arrays. In some embodiments, an advantage may be realized of avoiding having to bond multiple and different semiconductor emitter-layers together—and then attempting to balance the color-transmittances or other wavelength transmittances to construct a desired composite-color, or more generally, a composite-wavelength, in any given pixel. In some embodiments, an advantage may be realized of being able to use off the shelf active components. In some embodiments, an advantage may be realized of being able to use very few manufacturing processes, thus the micro-display yields and reliabilities should be high. In some embodiments, an advantage may be realized of being able to have as many as 4 different basis-colors for a micro-display instead of the usual three (red, green and blue; RGB), thus we can create expanded color-gamut displays that have become desirable. In some embodiments, an advantage may be realized of substantial pixel light-independence at the sub-1% cross-talk level.

Figure 5:
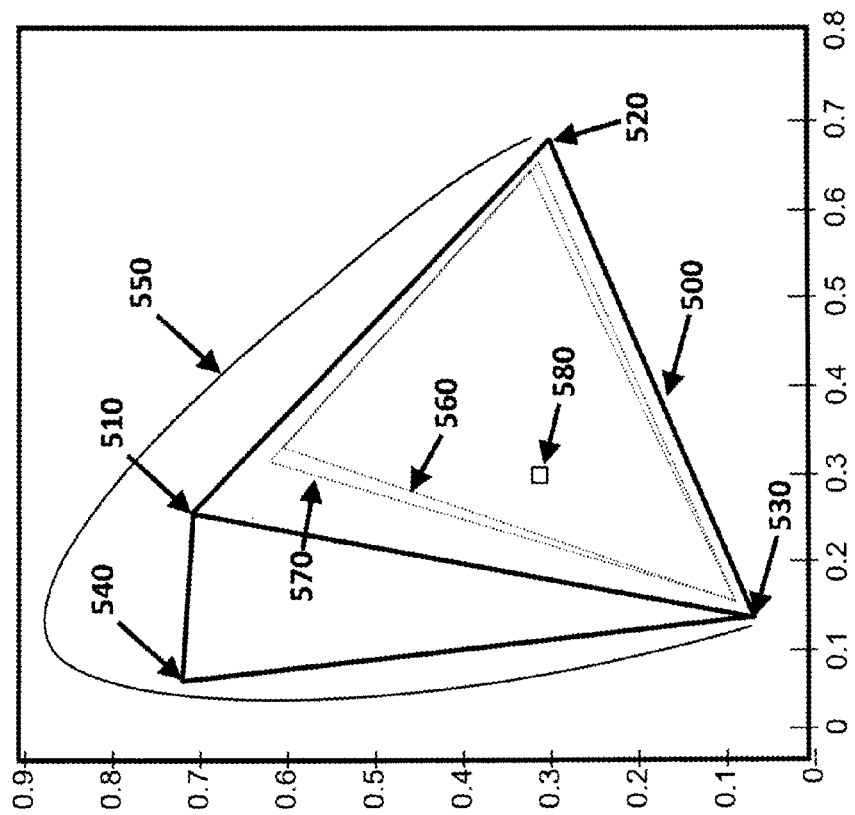
FIG. 5 is graph comparing an embodiment comprising a 4-LED-color CIE x-y color-space gamut to a standard 3-color Red/Green/Blue LED-source gamut, and the HDTV and modern-NTSC display color gamuts.

In some embodiments, advantages may be realized of facilitating 3 or more light sources or more generally, wavelength sources, per waveguide-end—and thus 6 or more color-basis gamuts covering almost the whole CIE x,y plane area. An example 4-LED-color CIE x-y color-space gamut for an embodiment is shown in FIG. 5, represented by the 4-sided trace 500 bounded by the small color points 510, 520, 530, and 540, in relation to a standard 3-color (Red/Green/Blue) laser-source gamut, represented in FIG. 5 by the RGB color points 510, 520, and 530, to illustrate how much the color space may be increased—to encompass substantially all of Pointer's gamut of all naturally-existing colors, represented by the horseshoe shaped FIG. 550, and considerably more—especially in the cyan region. Thus, embodiments provide substantially more color space than current HDTV and modern-NTSC display color-gamuts—represented by the central two triangles dotted-lines 560 and 570 in FIG. 5. Accordingly, embodiments may be implemented in the color television applications to substantially reduce/eliminate the usual RGB-space distortion and/or compression. The D8200 white color standard is the central small square 580.

Note that embodiments represented by the 4-sided trace 500 in FIG. 5 use 4 colors. Embodiments may be implemented with 5, 6, 7, 8, or more colors, to expand even more and in embodiments, exceed Pointer's gamut of all naturally-existing colors by approximating closely the horseshoe 550. A non-limiting example embodiment may comprise a two-tier waveguide structure, with 2 different emitters at each end of the waveguide—thus 4 colors, or more generally wavelengths, in each waveguide in a first plane, and with 4 different colors in the waveguide in the second plane, resulting in 8-distinct colors or wavelengths possible from the pixel area. This embodiment would closely approximate, with 8 different color points, virtually the whole of the horseshoe 550 visual color gamut, i.e., the full eye-capability spectrum in an electronic image. Additional color points may be added at will. In embodiments, this may be accomplished by adding more emitters at the ends of the waveguides. In embodiments, this may be accomplished by adding more waveguide planes.

As noted, in some embodiments, there is substantial pixel light-independence at the sub-1% cross-talk level. The 2-tier waveguide criss-cross solution of FIGS. 1 & 2 near-eliminates potential cross-talk as the vertically-directed light created at each pixel (i.e., directed out of the waveguide plane, perpendicular) simply passes straight through the adjacent waveguide (assuming appropriate anti-reflection coatings as necessary on the waveguide-surfaces to reduce multiple-reflections and scattering).

In the embodiments represented by FIGS. 3 & 4, the single planar-layer of parallel waveguides avoids a criss-cross in the plane of the waveguides—which would incur scattering cross-talk between crossing waveguides, thus un-acceptably low-contrast pixels. The concept of multi-emitters placed at the ends of parallel waveguides substantially eliminates that problem—as only single pixels along the waveguide are switched on at any instant by the CMOS-backplane circuitry.

Embodiments are disclosed of a method for emitting multiple wavelengths in a direction to form a pixel array, comprising for each pixel in the array: generating a plurality of pixel wavelengths through a pixel area, comprising the steps: propagating a plurality of different wavelengths along a length of one or more respective waveguides of electro-optically active material; and shifting in response to a switching signal the plurality of different wavelengths propagating in the one or more respective waveguides by substantially 90 degrees to emit the plurality of different wavelengths through the respective pixel area.

In embodiments, the respective waveguides have emitters disposed at only one end thereof to propagate wavelengths in only one direction therethrough. In embodiments, the waveguides have emitters disposed at each end thereof to propagate wavelengths in opposite directions through the respective waveguide.

In embodiments, the plurality of different wavelengths are propagated along a length of a single waveguide; and the respective waveguide for each pixel is arranged in parallel with the single waveguides of other of the pixels.

In embodiments, each of the pixels is formed by a first and a second waveguides, wherein a first set of the different wavelengths are propagated along a length of the first waveguide, and a second set of the different wavelengths are propagated along a length of the second waveguide, wherein the respective first waveguides are arranged in parallel in a first plane, and wherein the respective second waveguides are arranged in parallel in a second plane that is parallel to the first plane.

A variety of different design switching elements, now known or to be designed in the future, disposed at the desired pixel-locations, may be used to implement embodiments, and may be driven by back-plane electronic circuitry.

In embodiments, switchable Bragg-grating technology may be used for the switching elements based on a nano-composite material known as a 'reactive monomer liquid crystal mix'-a modulate-able hologram that can switch the direction of propagating light. See for example, the description by Crawford, G. P., (2003) 'Electrically switchable Bragg gratings', Optics and Photonics News, April issue, pp 54-59. An advantage to this switchable Bragg-grating technology is high efficiency.

In embodiments, a skewed transmission hologram may be used for the switching elements, with the skewed transmission hologram interacting with p-polarized light and in turn reflecting that light through 90 degrees.

In embodiments, electro-optically modulate-able polymers may be used for the switching elements. Such electro-optically modulate-able polymers are moldable with low fabrication-costs into such waveguides/holograms. Such materials are in production to replace expensive traditional $LiNiO_3$, for example. For example, using chromophores (organic molecules that are specially engineered to control the propagation of light by means of an applied electric field), Lumera Corp. (Bothell, Wash.) has created a modulator that can operate at 100 GHz at roughly half the voltage of existing modulators (3 to 4.5 volts), for less cost. The refractive index of Lumera's electro-optic polymer is 1.5 to 1.6, compared to that of lithium niobate with an index of 2.2. In embodiments, devices made with this modulateable polymer material may be run at higher operational speeds with lower optical losses, lower power consumption, and lower cost of fabrication than existing devices using inorganic materials.

In embodiments, structured surface-plasmon surfaces may be used to direct plasmons through 90 degrees out of a 2D plane to realize embodiments of the switching elements. See for example, Baron, A. G., et al, (2011) 'Compact antenna for efficient and uni-directional launching and decoupling of surface plasmons', Nano Letters, Communication accepted for publication, 12th September. Relief gratings of non-linear element heights and spacings indicate high-efficiency re-routing of light out-of-plane. The same concept is immediately translate-able to light or other wavelengths in place of plasmons. See for example FIG. 1 from the Baron paper referenced in this paragraph.

Figure 6:
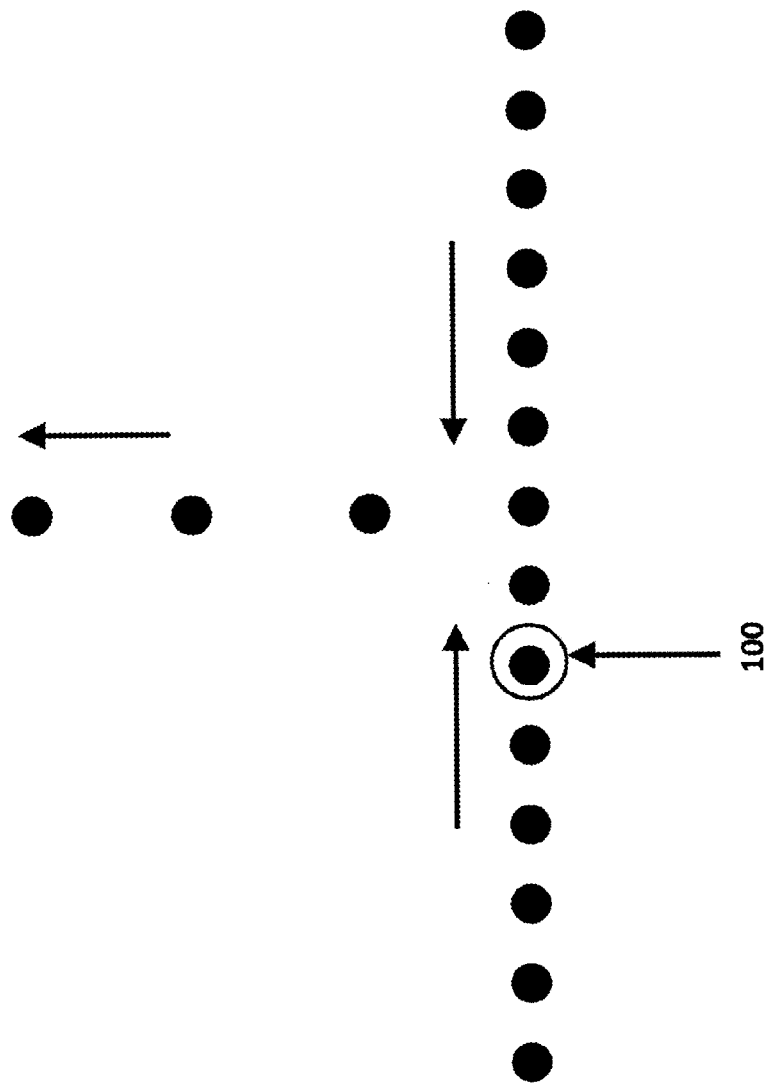
FIG. 6 is graph illustrating nano-plasmon-polariton chain-particle light-propagation and corner-turning.

In embodiments, polariton-chain coupling, where 90-degree turns for polaritons are created using chains of closely spaced nano-particle may be used to form the switching elements. At the chain-termination, light can be launched. See for example, Brongersma, M. L. et al, (2000) 'Electromagnetic energy transfer and switching in nanoparticle chain arrays below the diffraction limit', Phys. Rev. B, Volume 62, R13656; and Citrin, D. S. (2006) 'Plasmon-polariton transport in metal-nanoparticle chains embedded in a gain medium' Optics Letters, Volume 31, 98. Such a chain-structure that could be embedded in waveguides is shown in FIG. 6, illustrating nano-plasmon-polariton chain-particle light-propagation and corner-turning. In both the plasmon-polariton solutions, the light-switching through 90-degrees (light-arrows, from horizontal to vertical) occurs at the colored nano-particle 600. In embodiments, the timing of this rotation may be electrically-controlled by the CMOS-backplane circuitry.

In some embodiments, a distributed Bragg-grating solution may be used for the switching elements.

In embodiments, just a single pixel assembly may be formed that is capable of emitting multiple wavelengths in a direction through a pixel area. The pixel assembly may comprise, in embodiments, one or more waveguides made from electro-optically active material; a plurality of different wavelength emitters, the different wavelength emitters disposed at one or more of the ends of the respective one or more waveguides to propagate their respective wavelengths therealong and capable of being switched; and at least one switch disposed in relation to the one or more waveguides to cause when activated, a shifting of the wavelengths propagating in the one or more waveguides of the pixel assembly by substantially 90 degrees to be emitted through the respective pixel area.

Regarding fabrication, in an embodiment for a 2K (horizontal) by 1K (vertical) array of pixels, RGB 3-color display, 1K×3=3K few-micron-dimensions LEDs or laser diodes (LDA's) may be butt-couple bonded to the ends of the 1K horizontal waveguides (there are 2K pixels along each horizontal waveguide). In embodiments, robotic pick-and-place construction and two-lead wire-bonding electrical connection to the CMOS back-plane circuitry through the 4 peripheral edges may be used.

In embodiments, the waveguides may be fabricated as an integrated set by injection-molding of electro-optically-variable plastic or glass material, complete with top/bottom transparent (thin-film deposited) ITO or PEDOT:PSS-electrode coatings at desired pixel locations, i.e., distributed along the waveguides at the pre-determined pixel positions. In embodiments, a straight-forward x, y & rotation-angle alignment of the waveguide-set to the CMOS electrical-connection pads may be used to obtain micron tolerances.

Regarding device integrity, in embodiments construction of the micro-display may involve less than 50% of the processing steps of a quantum photonic imager (QPI)(see for example, El-Ghoroury, H. S., Brown, R. G. W., McNeill, D. A., DenBoer, H. & Lanzone, A. J., (2010) 'Quantum Photonic Imagers and Methods of Fabrication Thereof', U.S. Pat. No. 7,829,902), thereby obtaining an array device that is adequate for production and sales. In this respect, in embodiments where the array device is assembled from mostly off-the-shelf photonics components, the individual device-yield risks have already been eliminated. Thus, in embodiments, device reliability, repeatability and cost-level may be considerably more achievable than the QPI. In such embodiments, a large amount of clean-room fabrication effort may be substantially eliminated, including the large number of processing steps normally involved (over 2 dozen)—resulting in yields that are poor—even with >90% yields per processing step—and the challenges of bonding together reliably and repeatably—quite dis-similar semiconductor materials.

Regarding electrical power consumption and display brightness, in example embodiments a display-chip of HDTV capability, 1920 (H)×1080 (V) pixels horizontally and vertically is discussed. If the array chip diagonal is 0.87 inches, then in embodiments the pixels may be each ~10 microns-square. It may further assumed that this display-chip may to operate in an optical system to create a 16-cm by 9-cm display whose brightness is 1000 Nits, so that it can be used under normal outdoor-illumination conditions. This is about 3.3× the brightness of a standard LCD display panel (which works indoors—but not very well outdoors). Further, projectionlens losses are assumed to be 50%. To create a D8200-standard uniform white display, the required light-output power of each color to be present in each pixel under CW conditions is Red (630 nm)=$1.15*10^{-5}$, Green (550 nm)=$2.93*10^{-5}$ and Blue (460 nm) $2.81*10^{-6}$ lumens per pixel, calculated using standard optical textbook photometry. Converting these Lumens to Watts using standard Photometry to Radiometry math, it may be estimated that the total optical power at the display chip may be 0.67 Watts, assuming waveguide emission of only 50% of the LED light. Wallplug-efficiencies (photons out for electrons in) for LEDs are around 50%. If the LEDs couple 90% of their light into the waveguides to which they are direct-bonded, then the electrical power requirement for the display chip is ~1.49 Watts to achieve the 16×9 cm HDTV display at 1000 Nits brightness. Power-consumption for direct-writing of bright images into the human-eye would be greatly reduced from this level.

Accordingly, in embodiments, arrays of multi-color light-emitting pixels, or more generally, multi-wavelength-emitting pixels are described to form a 2D display, where all the colors or wavelengths to be emitted are projected through a 2D plane. In some embodiments, all the colors or other wavelengths to be emitted may be created in the same 2D plane waveguide. In embodiments, discrete emitters may be assembled on the edges of the display emitter-area, connected to pixels by optical-waveguides, the pixels being created by switchable electro-optical elements at their locations, switched by signals from an under-lying backplane electronic circuit.

In embodiments, the arrays of pixels may be constructed from waveguides—on whose ends may be bonded or otherwise projected into by light emitters such as LEDs or LDs, directing their light into the waveguides. The switching of the light from the waveguides at the desired pixel-positions may, in embodiments, be accomplished by switching elements, such as electro-optically switching holograms, 2D-diffraction-gratings or nano-plasmonic structures embedded in the waveguides at the pixel-positions desired, or any of the other designed described herein or to be developed in the future. Embodiments of the invention are not limited to particular switching element designs.

In embodiments, the overall 2D structure may be mechanically-simple to construct and align using modern robotic assembly techniques. In embodiments, much of the risks of sub-component device failure may be eliminated by using off-the-shelf, already-tested photonic components.

It should be noted that although the flow charts provided herein show a specific order of method steps, it is understood that the order of these steps may differ from what is depicted. Also two or more steps may be performed concurrently or with partial concurrence. Such variation will depend on designer choice. It is understood that all such variations are within the scope of the invention. It should also be noted that the phrase "a plurality" is intended to mean more than one, and is not intended to refer to any previous recitation of the word "plurality," unless preceded by the word "the."

All components and/or processes described heretofore are interchangeable and combinable with similar components and/or processes disclosed elsewhere in the specification, unless an express indication is made to the contrary. It is intended that any structure or step of an embodiment disclosed herein may be combined with other structure and or method embodiments to form an embodiment with this added element or step.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

I claim:

1. An array of pixel assemblies emitting multiple wavelengths in a direction, comprising:
   a plurality of pixel assemblies, each respective pixel assembly having a respective pixel area, the respective pixel assembly formed by:
   one or more waveguides made from electro-optically active material;
   a plurality of different wavelength emitters, the different wavelength emitters disposed at one or more of the ends of the respective one or more waveguides to propagate their respective wavelengths therealong and capable of being switched,
   wherein each of the respective waveguides has at least two of the different wavelength emitters emitting at respective different wavelengths and disposed to propagate their respective wavelengths along the respective waveguide; and
   at least one switch disposed in relation to the one or more waveguides to cause when activated, a shifting of the wavelengths propagating in the one or more waveguides of the pixel assembly by substantially 90 degrees to be emitted through the respective pixel area; and
   a backplane with an electronic circuit for switching the plurality of switches and the emitters.

2. The array as defined in claim 1, wherein multiple of the different wavelength emitters are discrete emitters bonded to one of the ends of a respective one of the waveguides.

3. The array as defined in claim 1, wherein the respective wavelength emitters are discrete emitters and the respective wavelengths of the different wavelength emitters are projected into one or both of the ends of the respective waveguide.

4. The array as defined in claim 1, wherein the respective waveguides have emitters disposed at only one end thereof to propagate wavelengths in only one direction therethrough.

5. The array as defined in claim 1, wherein the waveguides have emitters disposed at each end thereof to propagate wavelengths in opposite directions through the respective waveguide.

6. The array as defined in claim 1, wherein the waveguides of the plurality of the pixel assemblies are disposed in parallel in a single plane.

7. The array as defined in claim 1, wherein at least one of the emitters in the respective pixel assembly emits a visible wavelength.

8. The array as defined in claim 1, wherein at least one of the emitters in the respective pixel assembly emits a wavelength that is not visible.

9. The array as defined in claim 1, wherein each of multiple of the pixel assemblies include at least one emitter that emits visible wavelengths and at least one emitter that emits a wavelength that is not visible.

10. The array as defined in claim 1, wherein the array of pixel assemblies comprises:
    a first plurality of the waveguides made from electro-optically active material disposed in parallel in a first plane;
    a second plurality of the waveguides made from electro-optically active material disposed in a second plane that is parallel to the first plane, with the second plurality of waveguides substantially perpendicular to the first plurality of waveguides;

wherein each of the wavelength emitters is capable of being switched;

wherein each of the pixel areas is formed by one or more different respective switches disposed to cause when activated, a shifting of the wavelengths propagating in a first volume of one of the waveguides in the first plurality of waveguides and a second volume of one of the waveguides in the second plurality of waveguides, with the second volume disposed below the first volume, by substantially 90 degrees, to be emitted through the respective pixel area.

11. An array of pixel areas emitting multiple wavelengths in a direction, comprising:

a plurality of waveguides made from electro-optically active material disposed parallel in a plane;

a plurality of different wavelength emitters, with each of the respective waveguides having at least two of the different wavelength emitters emitting respective different wavelengths and disposed to propagate their respective wavelengths along the respective waveguide, the wavelength emitters capable of being switched;

a plurality of pixel areas, with each of the respective pixel areas formed by a different respective switch disposed to cause when activated, a shifting of the wavelengths propagating in a respective volume of one of the waveguides below the respective pixel area, by substantially 90 degrees, to be emitted through the respective pixel area; and a backplane with an electronic circuit for switching the respective switches and the emitters.

* * * * *